United States Patent [19]
Stephens, Jr.

[11] Patent Number: 5,810,906
[45] Date of Patent: Sep. 22, 1998

[54] METHOD FOR PREHEATING FEED MATERIALS FOR THE PRODUCTION OF IRON CARBIDE

[75] Inventor: Frank M. Stephens, Jr., Lakewood, Colo.

[73] Assignee: Iron Carbide Holdings, Ltd., Lakewood, Colo.

[21] Appl. No.: 703,981

[22] Filed: Aug. 28, 1996

[51] Int. Cl.⁶ .............................. C22B 1/02; C01B 31/30
[52] U.S. Cl. ............................................. 75/505; 423/439
[58] Field of Search ................................ 423/439; 75/505

[56] References Cited

U.S. PATENT DOCUMENTS

| | | | |
|---|---|---|---|
| Re. 32,247 | 9/1986 | Stephens, Jr. | 75/11 |
| 2,535,042 | 12/1950 | Cohn et al. | 23/208 |
| 2,752,234 | 6/1956 | Shipley | 75/26 |
| 2,780,537 | 2/1957 | Stelling et al. | 75/26 |
| 2,864,688 | 12/1958 | Reed | 75/26 |
| 2,894,831 | 7/1959 | Old et al. | 75/13 |
| 2,921,848 | 1/1960 | Agarwal | 75/26 |
| 3,021,208 | 2/1962 | Feinman | 75/26 |
| 3,356,488 | 12/1967 | Walsh | 75/34 |
| 3,761,244 | 9/1973 | Hoffert | 75/26 |
| 3,885,023 | 5/1975 | Gray et al. | 423/439 |
| 3,928,021 | 12/1975 | Matsubara et al. | 75/35 |
| 4,045,214 | 8/1977 | Wetzel et al. | 75/60 |
| 4,053,301 | 10/1977 | Stephens, Jr. | 75/11 |
| 4,202,534 | 5/1980 | Davis, Jr. | 266/172 |
| 4,360,378 | 11/1982 | Lindstrom | 75/34 |
| 4,396,423 | 8/1983 | Stephens, Jr. et al. | 75/25 |
| 4,398,945 | 8/1983 | Stephens, Jr. | 75/11 |
| 4,851,040 | 7/1989 | Hoster et al. | 75/26 |
| 5,073,194 | 12/1991 | Stephens et al. | 75/376 |
| 5,082,251 | 1/1992 | Whipp | 266/142 |
| 5,118,479 | 6/1992 | Stephens, Jr. et al. | 423/148 |
| 5,137,566 | 8/1992 | Stephens, Jr. et al. | 75/507 |
| 5,185,032 | 2/1993 | Whipp | 75/436 |
| 5,366,897 | 11/1994 | Hager et al. | 436/55 |
| 5,370,727 | 12/1994 | Whipp | 75/436 |
| 5,500,034 | 3/1996 | Martin | 423/439 |

FOREIGN PATENT DOCUMENTS

WO89/09290  10/1989  WIPO.

OTHER PUBLICATIONS

No. 40 of 1995, Jun. 26, 1995, Trinidad and Tobago.
No. 48 of 1994, Jun. 17, 1994, Trinidad and Tobago.
Oehlberg, "FIOR Process for Direct Reduction of Iron Ore", Iron and Steel Engineer, vol. 54, No. 4, Apr. 1974, pp. 58–60.

*Primary Examiner*—Melvyn Andrews
*Attorney, Agent, or Firm*—Sheridan Ross P.C.

[57] ABSTRACT

The present invention provides a two-stage method for pretreating an iron oxide-containing feed material prior to conversion of the material into an iron carbide-containing product. The feed material is heated in the first stage in an oxidizing atmosphere to volatilize and/or thermally stabilize sulfide sulfur and evaporate moisture and heated in a reducing atmosphere in the second stage to reduce ferric iron to ferrous iron. The reduced material is then introduced into a system in which the iron oxides are substantially converted to iron carbide.

23 Claims, 1 Drawing Sheet

METHOD FOR PREHEATING FEED MATERIALS FOR THE PRODUCTION OF IRON CARBIDE

FIELD OF THE INVENTION

The present invention relates to a method for preheating feed materials prior to their conversion from iron oxides to iron carbide. More specifically, the present invention utilizes a two stage preheating step in which the feed material is first heated in an oxidizing atmosphere and then further heated in a reducing atmosphere before being introduced into a system in which the iron oxides are substantially converted to iron carbide.

BACKGROUND OF THE INVENTION

The steel industry has become increasingly aware of the advantages of iron carbide as a feed material for the production of steel in electric arc furnaces, basic oxygen furnaces and continuous steel making systems. Numerous patents have been issued covering methods for converting iron bearing feed materials to iron carbide for use in these steel making operations. In many of these patents, reference is made to the advantages of preheating the feed materials prior to their introduction into the carbide conversion equipment.

For example, U.S. Pat. No. 5,137,566 outlines the advantages of a system in which the feed material is preheated in an oxidizing atmosphere prior to its introduction into the steps in which the iron oxides are converted to iron carbide (i.e., carbiding step(s)) in the process. Because the carbiding step is highly endothermic, it has been suggested in Trinidad and Tobago Patent No. 40/95 to Cliffs Reduced Iron Corporation that the preheating step be instead carried out in a reducing atmosphere so that the preheating step is the endothermic step of converting ferric oxides such as hematite into ferroso-ferric oxides such as magnetite (which has one third of the iron as ferrous and two thirds as ferric) or ferrous oxides such as wustite, thus reducing the heat burden in the subsequent conversion steps where the ferric and ferrous oxides are converted to iron carbide. Unfortunately, such a procedure of preheating the feed in an reducing atmosphere has several drawbacks. For example, if sulfide sulfur is present in the feed it is not stabilized as a sulfate or eliminated as sulfur dioxide in a reducing atmosphere and if allowed to continue on into the carbiding system as a reduced sulfur compound it can poison the reaction, preventing easy conversion of the iron oxides to iron carbide. In addition, the partial combustion of fossil fuels to produce a reducing atmosphere capable of converting ferric oxides to ferrous oxides results in low flame temperatures and toxic gases which contain large amounts of carbon monoxide. The low flame temperature results in inefficient heat transfer and poor thermal efficiency while the toxic nature of the combustion products prevents the discard of the waste gases without further expensive treatment.

SUMMARY OF THE INVENTION

In accordance with an embodiment of the present invention, a two-stage preheating system is provided. In the first stage, the feed material is heated in an oxidizing atmosphere which is thermally efficient (i.e., exothermic), provides a means of drying the feed materials by vaporizing free water, oxidizes sulfide sulfur compounds, oxidizes the iron compounds in the feed material, and raises the temperature of the feed material to a level at or above that required for further processing. In the second stage of the preheating system, the oxidized material is further heated in the presence of a reducing atmosphere created from the partial combustion of fossil fuels to convert ferric iron in ferric oxides such as hematite to ferrous iron in ferroso-ferric oxides such as magnetite and/or ferrous oxides such as wustite prior to their introduction into the carbiding steps.

The oxidizing atmosphere in the first stage of the preheating system is preferably obtained by combustion of the off gases from the second stage in the presence of excess oxygen to provide an oxidizing atmosphere and recover the unreleased heat present in the partially oxidized fossil fuels from the second stage off gas. In addition this post combustion of the second stage gases eliminates the presence of toxic carbon monoxide in the final off gases from the preheat system, thereby permitting the off gases to be safely released into the atmosphere.

DETAILED DESCRIPTION

Figure 1:
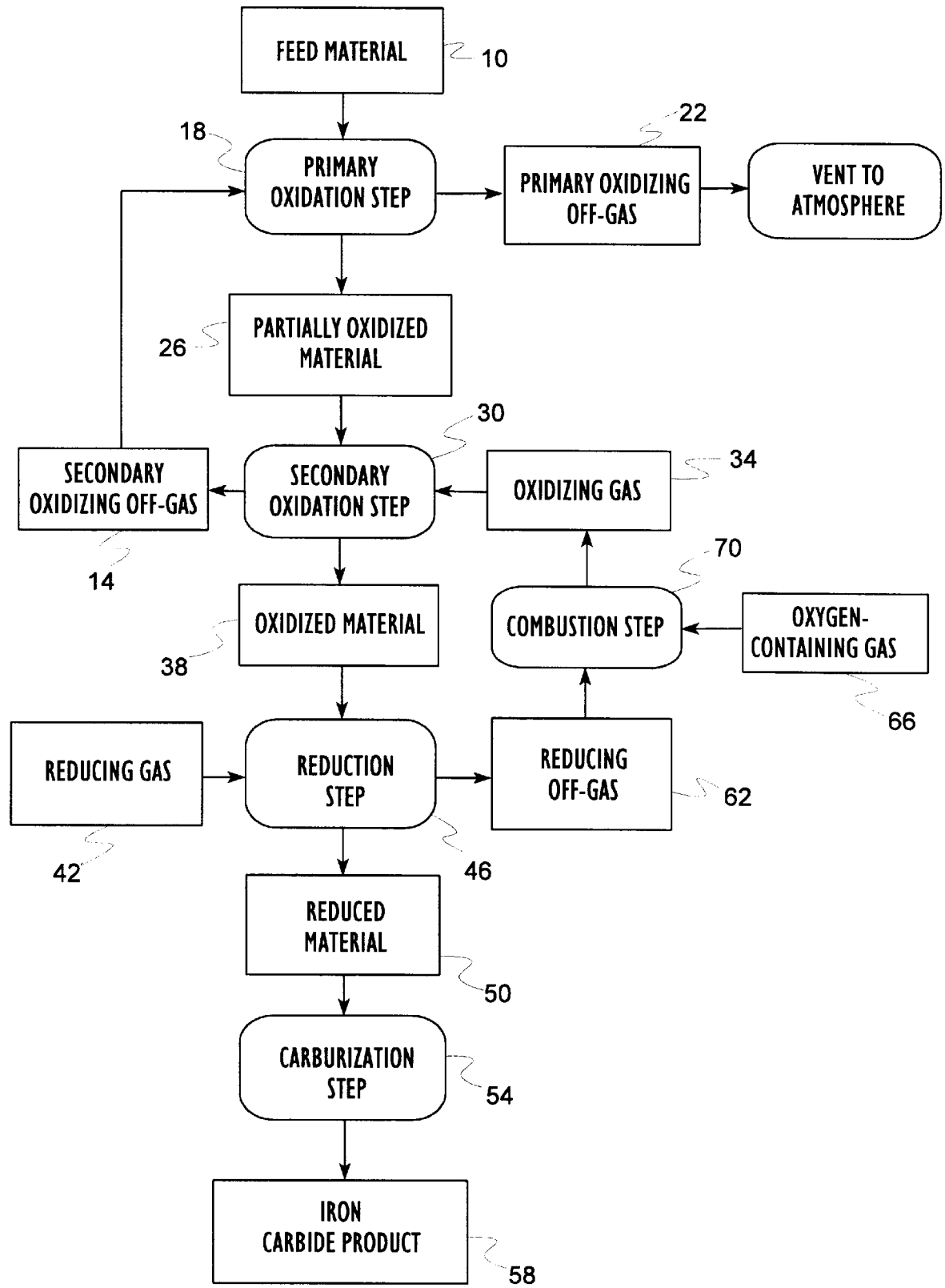
FIG. 1 is a flowchart according to a preferred embodiment of the present invention.

The present invention provides a method for pretreating an iron oxide-containing feed material prior to the conversion of the iron oxide into iron carbide. The method includes the steps of: (a) contacting the iron oxide-containing feed material with an oxidizing gas to oxidize any sulfide sulfur in the iron oxide-containing feed material to sulfur dioxide and/or a sulfate and form an oxidized iron oxide-containing material and an oxidizing off gas; (b) contacting the oxidized iron oxide-containing material with a reducing gas to convert ferric iron in the oxidized iron oxide-containing material into ferrous iron and form a reduced iron oxide-containing material; and (c) converting the iron in the reduced iron oxide-containing material into iron carbide.

The iron oxide-containing feed material is typically an iron oxide ore that contains a variety of compounds. A typical iron oxide ore contains from about 50 to about 68% by weight iron oxides, such as hematite, magnetite, goethite, and limonite; from about 0 to about 3% by weight sulfide sulfur; from about 1 to about 15% by weight water; and from about 1 to about 10% by weight various gangue minerals.

To reduce or eliminate the sulfide sulfur and moisture, the iron oxide-containing feed material is preheated in the presence of the oxidizing gas. Sulfide sulfur and free moisture and moisture of hydration can retard the conversion of iron oxides to iron carbide. Sulfide sulfur acts as a retardant because it poisons the iron surfaces. Moisture acts as a retardant because the conversion of iron oxides into iron carbides is partially controlled by the amount of hydrogen that can be converted to water by combining with oxygen in the iron oxides. Due to chemical equilibrium constraints, any increase in water coming into the carburization reactor in the iron oxide-containing feed material limits the amount of water that can be formed in the reactor and therefore the amount of iron oxides that can be converted into iron carbides with a given hydrogen input. In the oxidation step, sulfide sulfur is substantially converted to sulfur dioxide, which is a volatile gas, or stabilized by being oxidized and subsequently being combined with alkaline earth oxides, such as calcium oxide or potassium oxide, to form thermally stable sulfates. The moisture is removed in the oxidizing off gas as water vapor.

For best results in the carburization step, it is thus desired that a high rate of conversion of sulfide sulfur into sulfur dioxide and/or sulfates and water vaporization be realized.

Preferably, at least about 90% by weight, more preferably at least about 95% by weight, and most preferably at least about 99% by weight of the sulfide sulfur in the iron oxide-containing feed material is converted into one or both of volatile sulfur dioxide gas and thermally stable sulfates. It is preferred that the oxidized iron oxide-containing material contain no more than about 0.1% by weight, more preferably no more than about 0.05% by weight, and most preferably no more than about 0.01% by weight sulfide sulfur. Preferably, the moisture content of the oxidized iron oxide-containing material is no more than about 1% by weight, more preferably is no more than about 0.5% by weight, and most preferably ranges from about 0 to about 0.1% by weight of the oxidized iron oxide-containing material. Typically, the ferrous iron, if any, in the feed material is substantially entirely converted to ferric iron.

The oxidizing gas can be any gas that is capable of oxidizing the feed material. Any gas, or mixture of gases that contain free oxygen or a free oxygen precursor are preferred. The oxygen content of the oxidizing gas preferably ranges from about 1 to about 5% by volume, more preferably ranges from about 1 to about 3% by volume, and most preferably ranges from about 1 to about 2% by volume. The gas can also contain inert components such as nitrogen, carbon dioxide and water. For best results, the oxidizing gas is substantially free of reducing agents such as hydrogen gas and carbon monoxide. Preferably, the oxidizing gas contains no more than about 0.1% by volume of reducing agents. The preferred process for forming the oxidizing gas is discussed in detail below.

The temperature of the iron oxide-containing feed material during the oxidizing step is an important parameter for converting the sulfide sulfur into sulfur dioxide and sulfates and vaporizing moisture. The temperature of the feed material during the oxidizing step preferably ranges from about 300° to about 700° C., more preferably from about 400° to about 650° C., and most preferably from about 500° to about 650° C. The feed material typically has a significantly lower temperature than the inputted oxidizing gas. The feed material is thus heated by the oxidizing gas to the desired temperature range. To accomplish this result, the oxidizing gas has a temperature before the contacting step of at least about 600° C., more preferably ranging from about 1000° to about 1600° C., and most preferably ranging from about 1200° to about 1500° C.

The residence time of the feed material in the oxidation reactor is sufficient for substantially complete conversion of the sulfide sulfur into sulfur dioxide and/or sulfates. Typically, the residence time is at least about 2 minutes and more typically ranges from about 5 to about 10 minutes.

The oxidizing off gas has a composition that is in compliance with most environmental laws. The off gas typically comprises from about 2 to about 3% by volume free oxygen, no more than about 0.01% by volume carbon monoxide, and no more than about 0.05% by volume sulfur dioxide. If necessary, the oxidized off gas can be treated for removal of sulfur dioxide. The off gas, treated as necessary, can be inexpensively disposed of by discharge into the environment.

In the reduction step, ferric iron oxides, such as hematite, are reduced to ferroso-ferric oxides, such as magnetite, and/or ferrous oxides such as wustite prior to carburization. Ferroso-ferric oxides and ferrous oxides are nearly as reactive in the carburization step as ferric oxides and have the added advantage of requiring less reduction in the carburization step. Unlike preheating the iron oxides in the oxidation step which is exothermic, the reduction step is endothermic (whether using carbon monoxide and/or hydrogen gas as the primary reductant). Conducting the endothermic reduction step before carbiding, beneficially decreases the thermal input to the iron oxide-containing material required in the carbiding step.

In the reduction step, a substantial portion of the ferric iron in the ferric oxides is converted into ferrous iron in ferroso-ferric oxides and/or ferrous oxides. Preferably, at least about 50% by weight, more preferably at least about 75% by weight, and most preferably at least about 95% by weight of the ferric oxides in the oxidized iron oxide-containing material is reduced to ferroso-ferric and/or ferrous oxides. After the reduction step, the oxidized iron oxide-containing material preferably contains no more than about 50% by weight, more preferably no more than about 25% by weight, and most preferably no more than about 15% by weight ferric oxides.

The reducing gas can be any gas that is capable of reducing the ferric iron to ferrous iron. Any gas, or mixture of gases that contain a reductant such as free carbon monoxide, hydrogen gas or a carbon monoxide or hydrogen gas precursor are preferred. The reductant concentration in the reducing gas is preferably at least about 2 mole % and more preferably at least about 5 mole % more than the amount of reductant that is stoichiometrically required to convert the ferric iron in the oxidized material into ferrous iron. By way of example, the carbon monoxide content of the reducing gas preferably is at least about 10% by volume, more preferably ranges from about 10 to about 30% by volume, and most preferably ranges from about 10 to about 25% by volume. The reducing gas can contain from about 5% to about 75% by volume and more preferably from about 5% to about 10% by volume hydrogen gas. The reducing gas can contain up to about 10% by volume inert compounds such as nitrogen and up to about 10% by volume carbon dioxide. The reducing gas is substantially free of oxidants such as oxygen gas. Preferably, the reducing gas contains no more than about 0.1% by volume oxidants, such as free oxygen.

The reducing gas can be formed by combusting a carbon-based fuel, such as coal, oil, and natural gas, in the presence of less than a stoichiometric amount of oxygen gas. Preferably, the fuel is combusted in the presence of no more than about 60% of the stoichiometric amount of oxygen required for complete combustion of the fuel.

The temperature of the oxidized iron oxide-containing material in the reduction step is an important parameter for realizing a high rate of reduction of ferric iron to ferrous iron while maintaining sulfates in a stable form. As in the oxidizing step, the inputted reducing gas typically has a significantly higher temperature than the inputted oxidized material to initiate the reduction reaction. The temperature of the oxidized material during the reduction step preferably ranges from about 400° to about 775° C., more preferably from about 500° to about 750° C., and most preferably from about 550° to about 650° C. To accomplish this result, the reducing gas preferably has a temperature before the contacting step of at least about 600° C., more preferably ranging from about 600° to about 900° C., and most preferably ranging from about 700° to about 800° C. As will be appreciated, these temperature ranges are less than the destabilization temperature of sulfates (i.e., 1000° C. and more).

The residence time of the oxidized material in the reduction reactor is sufficient for conversion of the desired amount of the ferric iron into ferrous iron. Typically, the residence time is at least about 1 minute and more typically ranges from about 5 to about 30 minutes.

In both of the above-noted steps, the pressure of the oxidizing and reducing gases can be subatmospheric, atmospheric, and superatmospheric. To reduce capital and operating costs, atmospheric pressure is preferred.

To simplify the process configuration, the reducing off gas can be contacted with a gas containing free oxygen and converted into the oxidizing gas. For example, the reducing off gas can be combusted with air which causes residual carbon monoxide in the off gas to be converted into carbon dioxide. Preferably, the oxygen-containing gas contains at least about 105% of the stoichiometric amount of oxygen required to convert the carbon monoxide in the reducing off gas into carbon dioxide. In most cases, the oxygen-containing gas contains at least about 10% by volume free oxygen or a free oxygen precursor.

The oxidation and reduction steps can be conducted in separate reactors or a common reactor, as desired. While not wishing to be bound to specific types of equipment, the two-stage system can easily be practiced in a series of counter current preheaters in which the oxidizing and reducing gases flow counter currently to the solid iron bearing materials. An exemplary preheating reactor for such a process is a cyclone. Cyclones cause intimate contact to occur between the particles of the feed material and the gases while providing for separate particulate and gas output streams. Alternatively, both stages can be performed in a common reactor such as a rotary kiln where the gases flow counter currently to the solid iron-bearing material. To form separate oxidation and reduction zones in the kiln, air or oxygen gas is introduced into the kiln at the end of the reduction zone to form the oxidizing gas. Thus, the kiln solids discharge end operates in a reducing atmosphere and the kiln solids input end in an oxidizing atmosphere.

The outputted reduced iron oxide-containing material is converted into iron carbide in the carbiding step. Processes for the conversion of iron oxide ore to iron carbide and the subsequent use of that iron carbide in a direct steel-making process are disclosed in U.S. Reissue Pat. No. Re 32,247, U.S. Pat. No. 5,073,194, U.S. Pat. No. 5,118,479, U.S. Pat. No. 5,137,566 and U.S. Pat. No. 5,366,897 (one-step carbiding processes) copending U.S. patent application Ser. No. 08/181,997 entitled "TWO STEP PROCESS FOR THE PRODUCTION OF IRON CARBIDE FROM IRON OXIDE" filed Jan. 14, 1994, (two-step carbiding process), and copending U.S. patent application Ser. No. 08/596,954, now U.S. Pat. No. 5,733,357 entitled "PROCESS FOR CONVERTING IRON OXIDE TO IRON CARBIDE EMPLOYING INTERNALLY GENERATED CARBON OXIDE AS THE CARBIDING AGENT" filed Feb. 5, 1996, each of which is each incorporated herein by reference in its entirety.

The one- and two-step carbiding processes involve the conversion of iron oxide ore fines or concentrates into iron carbide using fluidized bed units operating at relatively low temperatures. The fluidizing gas is generally a five-component gas system containing hydrogen gas ($H_2$), carbon monoxide (CO), carbon dioxide ($CO_2$), methane ($CH_4$), and water ($H_2O$). Additionally, there may be nitrogen ($N_2$) present in the system. In the process having one carbiding step, the gas contains more than an equilibrium amount of methane to convert iron oxides into iron carbides in a single step. In the process having two carbiding steps, the iron oxides are first at least partially converted into metallic iron in a reducing step followed by conversion into iron carbide using the five-component gas containing more than an equilibrium amount of carbon monoxide and/or carbon dioxide.

While the above constitutes the equilibrium gases, it is to be understood that hydrogen, carbon and oxygen can be added to the system in any number of forms, including gaseous or solid form, so that the five gases at any given temperature and pressure are in the preferred proportions. For example, other hydrocarbon gases, such as propane ($C_3H_8$), can be added to attain the proper equilibrium of hydrogen, carbon and oxygen.

FIG. 1 of U.S. Pat. No. 5,137,566 is a stability diagram representative of the iron-oxygen-hydrogen-carbon system as it relates to the formation of the preferred form of iron carbide ($Fe_3C$) at about 527° C. The diagram shows that by controlling the gaseous atmosphere, it is not only possible to insure that iron carbide will be the stable end product, but that iron carbide can be produced directly from iron oxides without first producing metallic iron or by first producing metallic iron followed by carburization.

Because any point on the stability diagram at a given temperature and pressure represents a unique gas composition in this five species gas system, it is possible to translate the log coordinates into gas compositions based on the equilibrium constraints represented by the following equilibria:

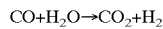

$$CO + H_2O \rightarrow CO_2 + H_2$$

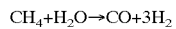

$$CH_4 + H_2O \rightarrow CO + 3H_2$$

FIG. 1 depicts a preferred embodiment of the present invention. Referring to FIG. 1, an iron oxide-containing feed material 10 at ambient temperature and a secondary oxidizing gas 14 at a temperature ranging from about 1000° to about 1600° C. are fed to a primary oxidation step 18 to produce a primary oxidizing off gas 22 and a partially oxidized material 26. In the primary oxidation step 18, the temperature of the feed material 10 is increased to a temperature ranging from about 300° to about 800° C., and more preferably from about 300° to about 500° C. In the primary oxidation step 18, a substantial portion of any surface moisture is driven off as steam and a substantial portion of any sulfide sulfur is oxidized to sulfate form or driven off as sulfur dioxide. Typically, at least about 99% by weight of the free moisture in the feed material 26 is driven off as steam and at least about 95% of the sulfide sulfur in the feed material 26 is oxidized in the primary oxidation step. As noted above, after scrubbing for the removal of $SO_2$ if it is present, the primary oxidizing off gas is substantially free of toxic components and is safe to vent to the atmosphere.

The partially oxidized material 26 is further preheated and oxidized in the secondary oxidation step 30 in the presence of an oxidizing gas 34 to form an oxidized material 38 and the secondary oxidizing gas 14. The oxidizing gas preferably has a temperature ranging from about 1200° to about 1600° C. After the secondary oxidation step, the oxidized material 38 has the same properties noted earlier for the oxidized iron oxide-containing feed material.

The oxidized material 38 and a reducing gas 42 are fed to a reduction step 46 where the ferric iron in the oxidized material 38 are partially or totally converted into ferrosoferric oxides and/or ferrous oxides in a reduced material 50. The reduced material 50 which has preferably been heated to a temperature in the range of 400° C. to 775° C. and more preferably to a temperature range of 500° C. to 750° C. is then fed to the carburization step 54 for converting iron oxides in the reduced material 50 into iron carbide to form an iron carbide product 58. A reducing off gas 62 and an oxygen-containing gas 66 are fed into a combustion step 70 where the carbon monoxide in the reducing off gas 62 is combusted with excess oxygen to provide the oxidizing gas 34 used as a source of heat in the primary and secondary oxidation steps.

The primary (initial) oxidation step 18, secondary (final) oxidation step 30 and reduction step 46 can take place in separate reactors or in separate zones of a single reactor. Cyclones are preferred for use as separate reactors and a rotary kiln can be used as a single reactor.

While various embodiments of the present invention have been described in detail, it is apparent that modifications and adaptations of those embodiments will occur to those skilled in the art. However, it is to be expressly understood that such modifications and adaptations are within the spirit and scope of the present invention as set forth in the following claims.

What is claimed is:

1. A method for pretreating an iron oxide-containing feed material prior to the conversion of the iron oxide into iron carbide, comprising:
   (a) contacting the iron oxide-containing feed material with an oxidizing gas to form an oxidized iron oxide-containing material and an oxidizing off gas, wherein the oxidized iron oxide-containing material includes ferric oxides;
   (b) contacting the oxidized iron oxide-containing material with a reducing gas to form a reduced iron oxide-containing material and a reducing off gas, wherein at least most of the ferric oxides in the oxidized iron oxide-containing feed material are reduced to one of ferroso-ferric or ferrous oxides in the reduced iron oxide-containing material; and
   (c) converting the reduced iron oxide-containing material into iron carbide.

2. The method of claim 1, wherein the oxidizing gas comprises at least about 1% by volume free oxygen.

3. The method of claim 2, wherein the oxidizing gas comprises no more than about 0.1% by volume hydrogen gas.

4. The method of claim 2, wherein the oxidizing gas comprises no more than about 0.1% by volume carbon monoxide.

5. The method of claim 1, wherein the oxidizing gas has a temperature of at least about 600° C. before the first contacting step to heat the oxidized iron oxide-containing material.

6. The method of claim 1, wherein the oxidized iron oxide-containing material has a temperature ranging from about 400° C. to about 650° C. in the first contacting step.

7. The method of claim 1, wherein the oxidizing off gas comprises no more than about 0.1% by volume carbon monoxide.

8. The method of claim 1, wherein the iron oxide-containing feed material contains sulfide sulfur and at least about 90% by weight of the sulfide sulfur in the iron oxide-containing feed material is converted into a sulfate, sulfur dioxide or mixtures thereof in the first contacting step.

9. The method of claim 1, wherein the oxidized iron oxide-containing material comprises no more than about 0.1% by weight sulfide sulfur after the first contacting step.

10. The method of claim 1, wherein the reducing gas comprises at least about 10% by volume carbon monoxide.

11. The method of claim 10, wherein the reducing gas comprises no more than about 10% by volume of each of inert gases and carbon dioxide.

12. The method of claim 10, wherein the reducing gas comprises no more than about 0.1% by volume free oxygen.

13. The method of claim 1, wherein the reducing gas has a temperature of at least about 600° C. before the second contacting step to heat the reduced iron oxide-containing material.

14. The method of claim 1, wherein the reduced iron oxide-containing material has a temperature ranging from about 400° C. to about 775° C. in the second contacting step.

15. The method of claim 10, wherein the reducing off gas comprises no more than about 10% by volume carbon monoxide.

16. The method of claim 1, wherein at least about 50% by weight of the ferric oxides in the oxidized iron oxide-containing material are converted into ferroso-ferric oxides or ferrous oxides in the second contacting step.

17. The method of claim 1, wherein the reduced iron oxide-containing material comprises no more than about 50% by weight ferric oxides after the second contacting step.

18. A method for pretreating an iron oxide-containing feed material prior to the conversion of the iron oxide into iron carbide, comprising:
   (a) partially combusting a fuel to form a reducing gas;
   (b) contacting the reducing gas with an oxidized iron oxide-containing material containing ferric oxides to form a reduced iron oxide-containing material and a reducing off gas, wherein at least moat of the ferric oxides in the oxidized iron oxide-containing material are converted to ferroso-ferric or ferrous oxides in the reduced iron oxide-containing material; and
   (c) contacting the reducing off gas with oxygen to form an oxidizing gas;
   (d) contacting the oxidizing gas with an iron oxide-containing feed material to form the oxidized iron oxide-containing material and an oxidizing off gas; and
   (e) converting the iron oxides in the reduced iron oxide-containing material into iron carbide.

19. The method of claim 18, further comprising:
   (f) discharging the oxidizing off gas into the atmosphere.

20. The method of claim 1, wherein the reducing gas is formed by partially combusting a fossil fuel.

21. The method of claim 20, wherein the oxidizing gas is formed by contacting the reducing off gas with oxygen.

22. A method for pretreating an iron oxide-containing material before conversion of the iron oxide into iron carbide, comprising:
   (a) contacting the iron oxide-containing feed material with an oxidizing gas to form an oxidized iron oxide-containing material and an oxidizing off gas;
   (b) contacting the oxidized iron oxide-containing material with a first reducing gas to form a reduced iron oxide-containing material and a first reducing off gas, wherein at least most of the ferric oxides in the oxidized iron oxide-containing feed material are reduced to one of ferroso-ferric or ferrous oxides in the reduced iron oxide-containing material; and
   (c) contacting the reduced iron oxide-containing material with a second reducing gas that is different from the first reducing gas to convert the iron oxides in the reduced iron oxide-containing material into metallic iron in a metallic iron-containing product; and
   (d) thereafter contacting the metallic iron-containing product with a carbon containing gas different from the first and second reducing gases to convert the metallic iron in the metallic iron-containing material into iron carbide.

23. The method of claim 22, wherein the first reducing gas is formed by partially combusting a fuel and the oxidizing gas is formed by contacting the first reducing off gas with oxygen.

* * * * *